Oct. 14, 1958  H. F. KOENIG III ET AL  2,856,044
AUTOMATIC SHIFT TWO-SPEED PRESS BRAKE
Filed Dec. 3, 1956  2 Sheets-Sheet 1

INVENTORS.
HENRY F. KOENIG, III
AND MERRILL W. HAZELTON,
BY
Allen + Allen
ATTORNEYS.

Oct. 14, 1958  H. F. KOENIG III ET AL  2,856,044
AUTOMATIC SHIFT TWO-SPEED PRESS BRAKE
Filed Dec. 3, 1956  2 Sheets-Sheet 2
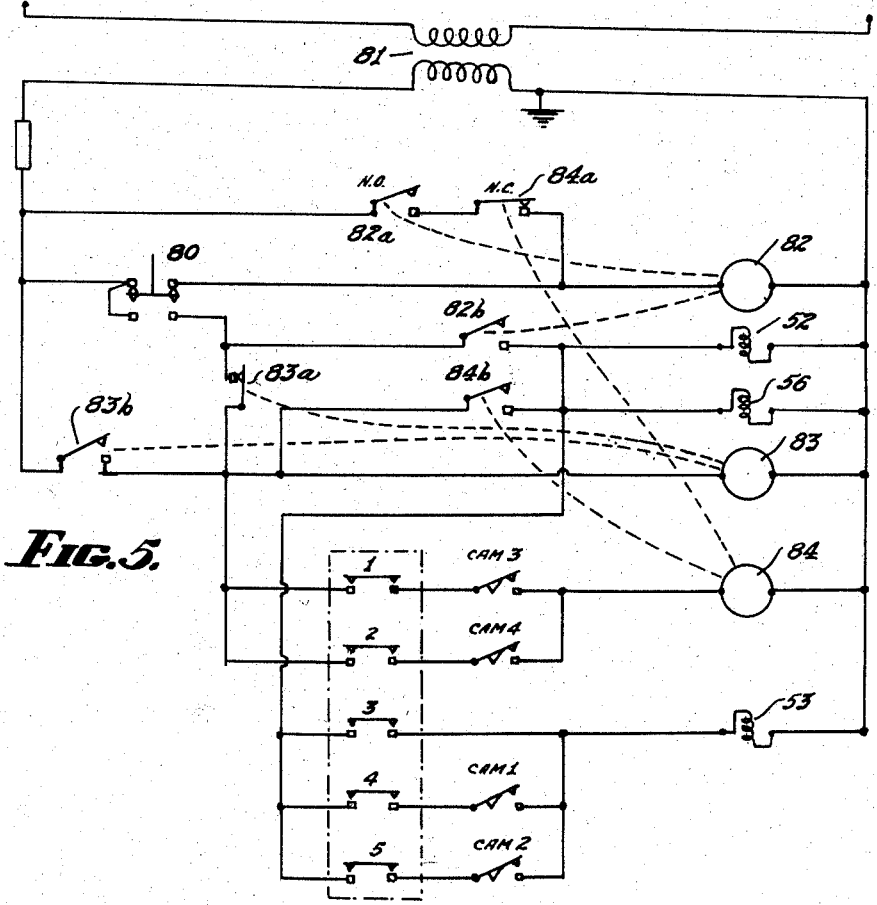
FIG. 5.
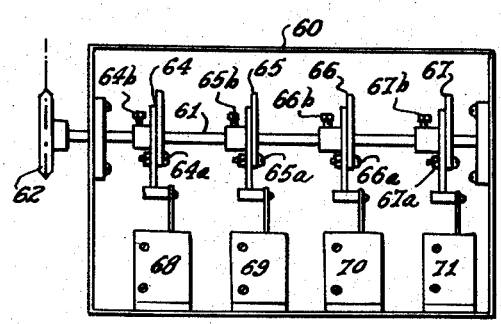
FIG. 4.
| | POS. | SELECTOR CONTACTS | | | | |
|---|---|---|---|---|---|---|
| | | 1 | 2 | 3 | 4 | 5 |
| Jog Low Speed Cont. | 0 | | | x | | |
| High Speed | A | x | | | | |
| Low Speed | B | | x | x | | |
| Short Low Dwell | C | x | | | x | |
| Long Low Dwell | D | x | | | | x |
FIG. 6.
INVENTORS.
HENRY F. KOENIG, III
AND MERRILL W. HAZELTON,
BY
Allen & Allen
ATTORNEYS.

United States Patent Office 2,856,044
Patented Oct. 14, 1958

2,856,044

AUTOMATIC SHIFT TWO-SPEED PRESS BRAKE

Henry F. Koenig III and Merrill W. Hazelton, Cincinnati, Ohio, assignors to The Cincinnati Shaper Co., Cincinnati, Ohio, a corporation of Ohio Application December 3, 1956, Serial No. 625,729

9 Claims. (Cl. 192—4)

This invention relates to an automatic shift two-speed press brake. The operation of a press brake is basically a compromise between the desirability of high speed operation on the one hand and the danger to operating personnel, the damage of workpieces, and the lack of experience and skill of the operator on the other hand. In the bending of a piece of sheet metal by means of a press brake, a V-shaped male die presses a flat sheet of metal into a V-shaped female die with the result that the overhanging portion of the workpiece is caused to move upwardly. If the operation is done at high speed, the sudden upward movement of the overhanging portion of the workpiece creates a hazard for operating personnel. If the workpiece is heavy, a further hazard is created when the movable die is raised and the workpiece tends to fall out of the brake.

If the stock being operated upon is thin, then high speed operation results in reverse kinks in the material which render the workpiece rejectable.

These problems can be overcome if the brake operated at a very slow speed but operation at such slow speed reduces production to the extent that costs are greatly increased.

Very experienced and highly skilled operators can effectively make the compromise indicated above by letting a machine operate at high speed until the male die is about to contact the workpiece and then causing the machine clutch to slip so as to carry out the forming operation at relatively slow speed and as soon as the forming operation is complete, permitting full clutching to return the die to its uppermost position at high speed. However, it takes a long time for an operator to acquire the experience and skill necessary for this operation and furthermore it is a very fatiguing and nerve-racking operation. Slipping the clutch causes excessive clutch wear and decreases the efficiency of the machine.

It would, therefore, be highly desirable to have relatively simple automatic shift mechanism with a two speed transmission whereby the ram would descend at high speed to a point just before contact with the workpiece and then slow down to a relatively slow speed for the forming operation and then just past dead center, shift back to high speed for return to the top of the stroke.

Machines have been built where such shift has been accomplished but all of these machines have been subject to one or another serious objection. Thus, for example, crank slow-down mechanisms have been provided but the amount of slow-down is relatively small. Electrical devices such as eddy current clutches have been provided but these are subject to high losses both electrically and in regard to fly wheel energy. There have been two speed drives involving two fly wheels and two clutches. Such arrangements are of course very costly and as will be clear the slow speed fly wheel has to be of tremendous size because the energy of the fly wheel changes as the square of the speed. Planetary clutches have been used for the purpose but these are complicated and costly.

The same is true of mechanical linkages and elliptical gears and various hydraulic mechanisms. The clutch slipping method has also been accomplished by electrical means but this only achieves a partial solution of the problem and the fixed cycle is provided wherein the point of slow-down and speed-up cannot be adjusted.

With the foregoing considerations in mind, it is an object of the present invention to provide an automatic ram slow-down which will be relatively simple and will avoid the disadvantages outlined above. It is another object of the invention to provide a mechanism whereby press brake production will be substantially increased because of the greater number of strokes per minute which may be made.

It is still another object of the invention to provide a mechanism as outlined which is highly flexible in that the starting point and duration of the slow-down may be varied as desired. Yet another object of the invention is the provision of a mechanism of the character described wherein a single fly wheel is used with a two-speed transmission and two clutches. In connection with the last named object, it is still another object to provide clutching members of low inertia where such members are required abruptly to change speed. Again it is an object of the invention to provide a brake mechanism of the "fail-safe" type which is spring loaded for application of the brake and released by air pressure. A still further object includes the provision of compact clutch and brake units which require no adjustment for wear.

These and various other objects of the invention which will be described in more detail hereinafter are accomplished by that construction and arrangement of parts of which the following is a detailed description.

Reference is made to the drawings forming a part hereof and in which:

Figure 4 is an elevational view of the cam switches.

Figure 5 is a simplified wiring diagram; and

Figure 6 is a table to assist in the understanding of the wiring diagram.

Briefly, in the practice of the invention, a single fly wheel is driven by V-belts or the like from an electric motor or other prime mover. This fly wheel stores the energy for performing the press brake operations. The fly wheel and associated parts are freely rotatable on a fly wheel shaft. The fly wheel shaft carries a clutch disc splined thereto and clutch means are provided for clutching the fly wheel to the fly wheel shaft. The fly wheel shaft is connected through reduction gearing to the eccentric shaft which actuates the ram of the machine.

Also freely rotatable on the fly wheel shaft is a sleeve carrying a clutch disc and the sleeve is geared to the drive shaft through back gearing so that when the first mentioned clutch is released and the clutch on the sleeve is engaged, the motion of the fly wheel is transmitted to the sleeve and through the back gearing to the fly wheel shaft. It is then further transmitted to the eccentric shaft as before. The clutches may be operated in well known manner, either hydraulically, pneumatically or by magnetic means. In the present disclosure they are pneumatically operated by means of annular bladders which may be inflated to fit the clutches. A selector valve is arranged in the air supply line to select either the high speed or low speed clutch. A spring brake is provided which may be released pneumatically by inflation of a similar annular bladder.

Figure 2:
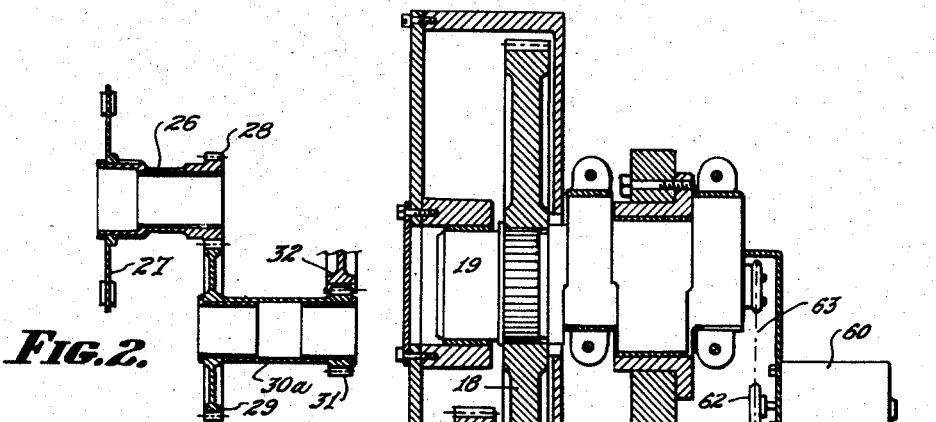
Figure 2 is a fragmentary cross-sectional view of a portion of Figure 1 but separated from adjacent parts for a clearer understanding.
Figure 1:
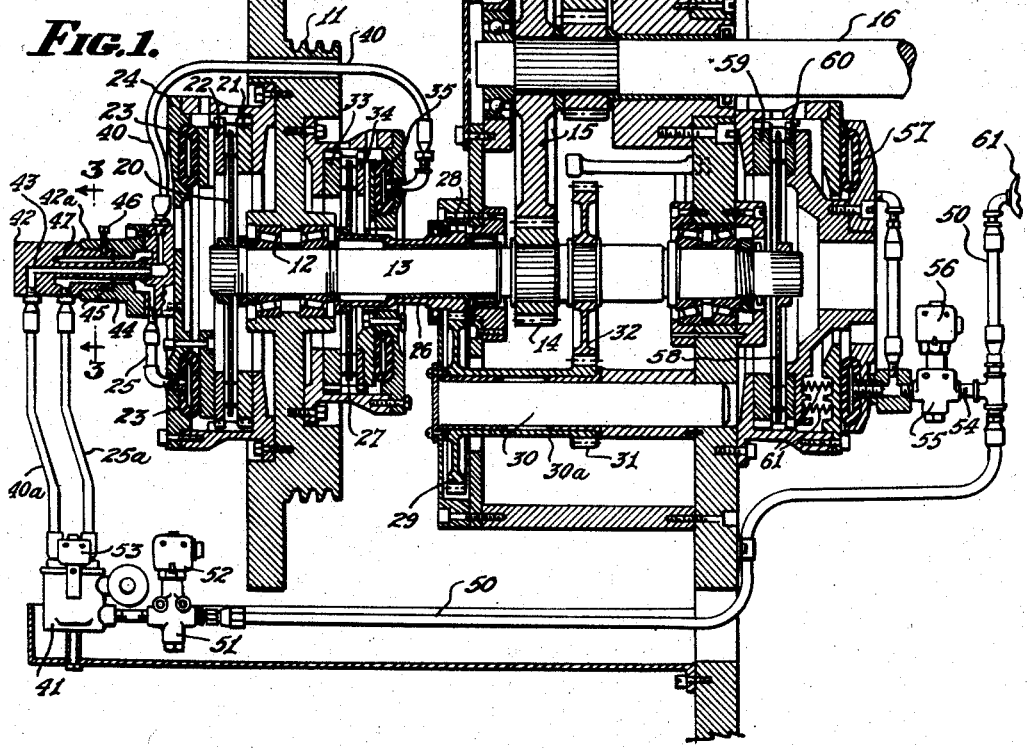
Figure 1 is a cross-sectional view through a mechanism according to the invention.
Figure 3:
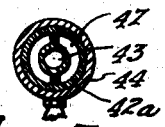
Figure 3 is a cross-sectional view taken on the line 3—3 of Figure 1.

Referring in greater detail to Figure 1, the fly wheel of the machine is indicated at 10. Grooves for V-belts are indicated at 11. The fly wheel is freely rotatable on roller bearings 12 upon the fly wheel shaft 13. The fly wheel shaft carries a pinion 14 which meshes with a gear 15 carried on the intermediate shaft 16 and a pinion 17 also carried on the intermediate shaft 16 in turn drives a gear 18 mounted on the eccentric shaft 19.

At the left-hand end of the fly wheel shaft 13 there is non-rotatably mounted a clutch disc 20. The disc 20 is adapted to be pinched between the plate 21 and the plate 22 upon inflation of the bladder 23. It will be understood that the plates 21 and 22 and the housing member 24 all rotate with the fly wheel and that when the clutch is disengaged, the disc 20 and shaft 13 are not rotating. When air is applied to the bladder 23 through the duct 25, the bladder 23 is inflated and presses the clamping member 22 toward the right and clamps the clutch disc 20 between it and the clamping member 21. This then locks the clutch disc to the fly wheel and thus causes rotation of the shaft 13 and the transmission of the rotation thereof through the pinion 14, gear 15, pinion 17 and gear 18 to the eccentric shaft 19. This is the high speed operation.

Also mounted upon the fly wheel shaft 13 is the sleeve 26. This sleeve carries fixed thereto at its left end a clutch disc 27 and at its right end a pinion 28. The sleeve 26 and its associated parts are freely rotatable on the fly wheel shaft 13. The pinion 28 meshes with a gear 29 mounted upon the back gear shaft 30 which also carries the pinion 31 which meshes with the gear 32 fixed on the fly wheel shaft 13.

From what has been said, it will be clear that when the high speed clutch is engaged and the fly wheel shaft 13 is rotating, the gear 32, pinion 31, gear 29, pinion 28, sleeve 26 and clutch disc 27 are being driven but the clutch disc 27 is simply idling between its respective clamping plates 33 and 34.

If now the bladder 23 is deflated and the low speed bladder 35 is inflated, the plate 34 is urged toward the left and pinches the clutch disc 27 between it and the clamping plate 33. The disc 27 is now locked to the fly wheel and transmits its rotation through the sleeve 26, pinion 28, gear 29, pinion 31 and gear 32 to the fly wheel shaft 13 so that the latter is now driven through the back gearing at a greatly reduced speed. By way of example, in an actual machine built according to the present invention, with a fly wheel speed of 500 R. P. M. with the high speed clutch engaged, the eccentric shaft 19 rotates at 30 R. P. M. With the low speed clutch engaged, this speed is cut down to about 7 R. P. M.

Because of the fact that when the high speed clutch is engaged and the back gearing and the clutch disc 27 are being driven by the flywheel shaft 13, we actually have a step-up gearing so that the clutch disc 27 may be rotating at say 2000 R. P. M. and it must be substantially instantaneously clutched to the fly wheel rotating at 500 R. P. M. For this reason it is very important that the clutch discs and the sleeves 26 and 30a have a very low inertia.

The bladder 35 is inflated through the line 40 and the lines 25 and 40 are fed from the lines 25a and 40a coming from the selector valve 41. The line 40a is connected into the fitting 42 which has a central hole 43. The fitting 42 is of course stationary while the member 44 being secured to the fly wheel and its associated parts rotates with the fly wheel. The fitting 42 has a portion of reduced diameter at 42a which seats within a counterbore within the member 44 and it is provided with an annular groove 45 engaged by a guide screw 46 to retain the parts in engagement. Thus, air through the line 40a passes through the hole 43 and into the line 40. Air from the line 25a passes into an annular space 47 whence it passes into the line 25.

The air supply for the clutches comes through the line 50 through a main clutch valve 51 controlled by a solenoid 52. It then passes into the selector valve 41 which is normally in a position to pass the air through the line 25a to energize the high speed clutch. The position of the selector valve 41 may be shifted to pass air through line 40a to energize the low speed clutch by the actuation of the solenoid 53.

A branch line 54 supplies air to a brake valve 55 controlled by a solenoid 56. Through the valve 55 air is supplied to the brake bladder 57.

On the right hand end of the fly wheel shaft 13 there is splined a brake disc 58, similar to the discs 20 and 27, adapted to be operated upon by the clamping rings 59 and 60. Springs 61 tend to urge the clamping plate 60 toward the clamping plate 59 to pinch the disc 58 therebetween to apply the brake. As will be clear from a study of the drawing, inflation of the bladder 57 operating against the compression of the springs 61 releases the brake. The line 50 may come from an accumulator 61 and a suitable compressor will be included in the pneumatic circuit.

As will appear hereinafter, the operation of either clutch and the brake are alternative so that when either clutch is engaged, the brake is released and when no clutch is engaged the brake is set. The valves 55, 51 and 41 are controlled respectively by the solenoids 56, 52 and 53 and the operation of these will be described in connection with Figures 4, 5 and 6.

The operation of the various solenoids is brought about by the action of a series of cam operated switches together with a selector switch which may be placed in any one of a number of positions. The cam switches are shown in Figure 4 and they are disposed within a housing 60 which is visible also in the upper right-hand side of Figure 1. A shaft 61 has its bearing in the housing 60 and is provided with a sprocket 62 and the shaft 61 is driven in timed relation to the eccentric shaft 19 by a sprocket and chain drive indicated generally at 63 in Figure 1. The individual cams are indicated at 64, 65, 66 and 67 and each cam operates a switch 68, 69, 70, 71 respectively. The cams are provided with adjustment so that the actuation of the switches may be changed as desired and different ones of the cams are provided with dwells of different lengths.

At a convenient place on the machine there may be provided a control panel and on this control panel there may be provided a selector knob which may be turned to a number of different positions. In the particular embodiment being described the selector may be turned to any one of five positions indicated as O, A, B, C, or D. The position of the selector knob controls the closing of one or more of the contacts numbered 1, 2, 3, 4 and 5 in Figure 5. From a study of the chart of Figure 6, it will be observed that with the selector in position O only the contact 3 is closed, while the remaining four contacts are open. In position A, only contact number 1 is closed. In position B, only contacts 2 and 3 are closed. In position C, only contacts 1 and 4 are closed, and in position D, only contacts 1 and 5 are closed.

Referring now to Figure 5, the foot switch by means of which the operator operates the machine is indicated at 80 and it will be seen that this is a two position switch. The pair of upper contacts are connected when the switch is not being depressed and the lower contacts are connected when the switch is depressed by the operator's foot. Power supply is obtained from a transformer 81 and it will be seen that when power is applied to the circuit with the foot switch 80 in the position shown, a circuit is established through the non-repeat coil 82. The non-repeat coil 82 energizes the switches 82a and 82b and closes them. This establishes a holding circuit to keep the non-repeat coil energized when the foot switch 80 is depressed.

When the foot switch 80 is depressed closing the two lower contacts, a circuit is established through the clutch valve solenoid 52 and the brake valve solenoid 56, whereby one of the clutches will be engaged and the brake will be released as heretofore described. Depending upon the setting of the selector valve, the ram will begin to operate. The selector valve is set so that it is in position to supply air to the high speed clutch when the coil 53 is not energized and to shift the valve to supply the low speed clutch when the solenoid 53 is energized. Closing of the foot switch 80 also energizes the constant run coil 83 which operates to open the switch 83a and to close the switch 83b. The automatic return coil 84, when energized, opens the switch 84a and closes the switch 84b.

Assuming now, for purposes of description, that the selector knob has been turned to position O and that the contact 3 only is closed, closing of the contact 3 establishes a circuit through the selector valve coil 53 shifting the selector valve to low position. In this situation when the operator steps on the foot switch 80 the machine will operate at low speed and when he releases the foot switch 80 the machine will stop. The ram may thus be controlled at low speed and may be stopped in any point of its stroke, either on the up stroke or on the down stroke. The ram may be caused to operate continuously at low speed by maintaining the foot switch 80 in the down position. The coil 84 is being by-passed and none of the cam switches are utilized.

If the selector knob is placed in position A, the chart of Figure 6 reveals that contact number 1 will be closed. In this position clearly the selector valve coil 53 is not energized and the high speed clutch will therefore be connected for operation. When the foot switch 80 is depressed, a circuit is set up through contact 1 and through the cam switch 3 into the automatic return coil 84. The cam switch 3 will generally be set so that it closes a few degrees past the bottom of the stroke and the dwell is such that the switch stays closed until the top of the stroke is reached. With this arrangement then the operator, by jogging the foot switch 80, can jog the ram and stop it at any point on its downstroke. When the ram reaches the point where the cam switch number 3 closes then the coil 84 is energized, closing the switch 84b and opening the switch 84a so that the ram automatically returns to the top of its stroke. When the ram reaches the top, cam switch number 3 opens causing the ram to stop because the air supply control valve coil 52 will be de-energized shutting off the air supply to the clutches and at the same time the brake control coil 56 will be de-energized to set the brake. In position A, therefore, we have operation in high speed throughout the stroke with no slow-down and with automatic return and automatic stop at the top of the stroke and the machine may be jogged on the down-stroke.

When the selector knob is turned to position B, only contacts numbers 2 and 3 will be closed. The operation in this position is the same as in position A, except that closing of the contact number 3 energizes the coil 53 and shifts the selector valve to low speed position. With contact number 2 closed, cam switch number 4 comes into play and operates in the same manner as cam switch number 3, i. e., it takes care of the automatic return and stop just as cam number 3 did. In this setting therefore the ram may be jogged at low speed on the down stroke and, depending upon the setting of the cam switch number 4, automatic return and stop are provided.

Positions C and D are the ones which involve a speed change and the only difference between these two is that in position C in addition to contact number 1, contact number 4 is closed while in position D contacts 1 and 5 are closed. Contacts 4 and 5 place into the circuit cam switch number 1 and cam switch number 2 respectively. The only difference between the two is that the cam for switch number 1 has a relatively short dwell whereas cam number 2 has a relatively long dwell. The purpose of this is to provide two automatic settings for slow down, one which will be useful when operating upon thin gauge material and the other being useful for operation upon material of a thickness of say ¼ inch.

In position C with contacts numbers 1 and 4 closed, the machine will run at high speed until cam number 1 closes cam switch number 1 which places the coil 53 into the circuit. This shifts the selector valve to low speed and causes the machine to operate at low speed. The duration of the low speed operation is determined by the dwell of cam number 1. At the end of the dwell cam switch number 1 opens and the coil 53 is deenergized and the selector valve shifts back to high speed position. Contact number 1 and cam switch number 3 operate as before to provide automatic return and automatic stop as described above in connection with position A.

In position D, contact numbers 1 and 5 are closed so that the only difference between this position and position C is that cam switch number 2 is called upon to operate instead of cam switch number 1. Cam number 2 has a longer dwell so that the slow speed operation is of longer duration than when cam number 1 is used. Cams number 1 and 2 are completely adjustable by means of set screws 64a, 65a, 66a, and 67a as to length of dwell and set screws 64b, 65b, 66b and 67b as to position of the dwell. The provision of the two positions C and D make it possible to provide automatically for two different durations of slow speed operation without requiring adjustment of the cams, so that for the great majority of sets the operator can simply use the selector knob and will not have to open the housing 60 for adjusting individual cams. This may, however, be done if desired.

The cam switch may be one which is commercially available as manufactured by Allen-Bradley Co., called a rotating cam limit switch type GSA 1–34.

From actual time studies it has been determined that with the particular machine described, the duration of a cycle at low speed all the way is .14 minute. At high speed the duration is .04 minute. In position C, with the short dwell, the duration of the cycle is .05 minute and in position D .06 minute. It will be seen, therefore, that with the automatic shift provided by this invention the cycle for thin stock is approximately ⅓ of what it would be if the machine had to be operated at low speed and less than half even for thick stock. This represents a considerable increase in production over a period of time.

It will be clear that various modifications may be made without departing from the spirit of the invention. No limitation should therefore be read into the invention otherwise than as set forth in the claims which follow.

Having now fully described the invention, what is claimed is:

1. In a machine tool having a main shaft, a two-speed, single direction transmission for said shaft, comprising a fly wheel mounted for free rotation on said shaft, a clutch disc splined on said shaft, and clutch means for clutching said clutch disc to said fly wheel for rotation of said shaft from said fly wheel at one speed in one direction, a sleeve freely rotatable on said shaft, reduction back-gearing connecting said sleeve to said shaft, a second clutch disc splined on said sleeve, second clutch means for clutching said second clutch disc to said flywheel for rotation of said shaft through said back-gearing from said fly wheel at a different speed and in the same direction, and means for actuating said clutches alternatively.

2. Apparatus according to claim 1, wherein said main shaft carries a brake disc splined thereto and means normally engaging said brake disc to brake said shaft and means for releasing said brake disc and concurrently engaging one of said clutch discs.

3. Apparatus according to claim 1, wherein said clutch discs and said sleeve and back-gearing are of the minimum mass consonant with power transmission requirements.

4. Apparatus according to claim 1, wherein said shaft has a brake disc splined thereon and means normally engaging said brake disc to brake said shaft, fluid means for releasing said brake means, fluid means for operating one or the other of said clutch means alternatively, and means for actuating both said fluid means concurrently.

5. In a press brake and the like having an eccentric shaft for actuating the ram of said brake, a two-speed, single direction transmission comprising a fly wheel shaft, and reduction gearing between said fly wheel shaft and said eccentric shaft; a fly wheel mounted for free rotation on said fly wheel shaft, a clutch disc splined on said fly wheel shaft, and clutch means for clutching said clutch disc to said fly wheel to transmit the motion of the latter to said eccentric shaft at one speed in one direction, a sleeve freely rotatable on said fly wheel shaft, reduction back-gearing connecting said sleeve to said fly wheel shaft, a second clutch disc splined on said sleeve, second clutch means for clutching said second clutch disc to said fly wheel to transmit the motion of the latter through said reduction back-gearing to said eccentric shaft at a different speed and in the same direction, and means for operating said clutches alternatively.

6. In a press brake and the like having an eccentric shaft for actuating the ram of said brake, a fly wheel shaft, and reduction gearing between said fly wheel shaft and said eccentric shaft; a fly wheel mounted for free rotation on said fly wheel shaft, a clutch disc splined on said fly wheel shaft, and clutch means for clutching said clutch disc to said fly wheel to transmit the motion of the latter to said eccentric shaft, a sleeve freely rotatable on said fly wheel shaft, reduction back-gearing connecting said sleeve to said fly wheel shaft, a second clutch disc splined on said sleeve, second clutch means for clutch- ing said second clutch disc to said fly wheel to transmit the motion of the latter through said reduction back- gearing to said eccentric shaft, means for operating said clutches alternatively, a brake disc splined on said fly wheel shaft, a non-rotatable brake shoe, spring means urg- ing said brake shoe into braking engagement with said brake disc, and means operative when either of said clutches is engaged for releasing said brake shoe from said brake disc.

7. Apparatus according to claim 6, wherein there is an annular inflatable bladder for actuating each of said clutches and for releasing said brake, a pneumatic circuit including a supply of air under pressure connected to said brake bladder through a valve, and to each said clutch bladder through a valve, and a selector valve for con- necting said supply alternatively to one or the other of said clutch bladders.

8. Apparatus according to claim 7, wherein each of said valves is provided with a solenoid, wherein switches are provided for energizing said solenoids, and wherein means are provided to actuate said switches in timed rela- tion to the rotation of said eccentric shaft.

9. Apparatus according to claim 8, including means for shifting the selector valve from high speed position to low speed position for a predetermined portion of the cycle and then back to high speed position.

References Cited in the file of this patent
UNITED STATES PATENTS

| | | |
|---|---|---|
| 2,304,030 | Schmitter | Dec. 1, 1942 |
| 2,304,031 | Schmitter | Dec. 1, 1942 |
| 2,577,641 | Wissman | Dec. 4, 1951 |
| 2,793,537 | Schmitter | May 28, 1957 |